United States Patent Office 3,445,210
Patented May 20, 1969

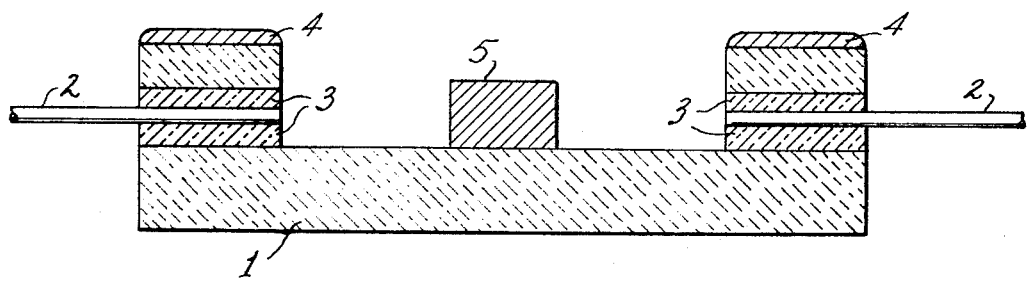
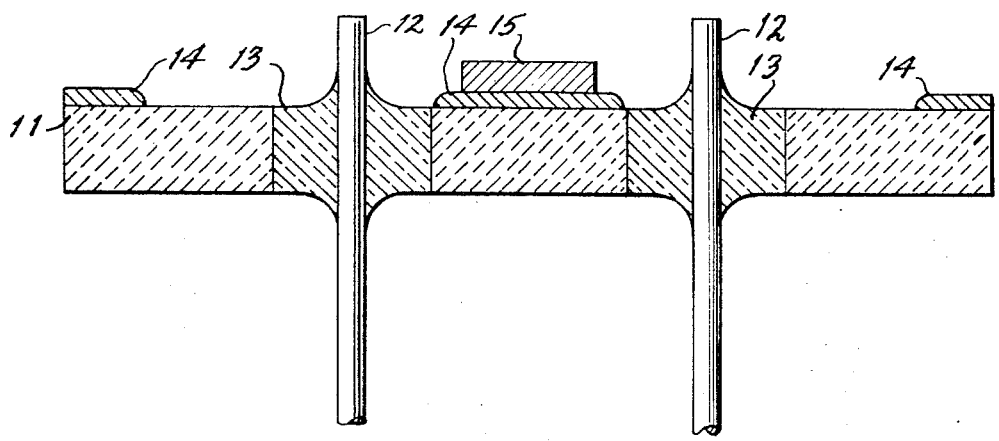

3,445,210
ADHESIVE MATERIAL AND METHOD OF USING SAME TO ADHERE CERAMIC MATERIAL TO METAL
Hiroyuki Matsuzaki and Shokichi Shimizu, Kawasaki-shi, and Masahiko Mizuo, Hunabashi-shi, Japan, assignors to Fujitsu Limited, Kawasaki, Japan, a corporation of Japan
Filed Mar. 2, 1965, Ser. No. 436,692
Claims priority, application Japan, Mar. 5, 1964, 39/12,193
Int. Cl. C03b 23/20
U.S. Cl. 65—43      7 Claims

ABSTRACT OF THE DISCLOSURE

An adhesive material comprises vanadium pentoxide in an amount of approximately 15% by weight, zinc fluoride in an amount of approximately 28% by weight, zinc oxide in an amount of approximately 27% by weight, boron oxide in an amount of approximately 21% by weight, aluminum oxide in an amount of approximately 4.5% by weight and titanium dioxide in an amount of approximately 4.5% by weight.

---

The present invention relates to an adhesive material and to a method of adhering ceramic material to metal. More particularly, the invention relates to an adhesive material for adhering ceramics and for adhering ceramics and metal and to a method utilizing the adhesive material of the present invention to adhere ceramics and metal.

Heretofore, the adhesion of ceramics and of ceramics and metal has been undertaken by the metallization of molybdenum manganese on the surface of ceramic material. The metal has also been brazed to the ceramic material. Furthermore, resin or "Pyroceram" cement have been utilized as adhesives, but they have proven to be difficult to work with as far as small-sized and irregularly-shaped components are concerned and have failed to provide adequate sealing properties. Furthermore, resin has proven to be lacking in thermal stability and mechanical strength as well as in adequate sealing properties.

An object of the present invention is to provide a new and improved adhesive material.

Another object of the present invention is to provide a new and improved method of adhering ceramic material and metal.

Another object of the present invention is to provide a new and improved adhesive material for adhering ceramics.

Another object of the present invention is to provide a new and improved adhesive material for adhering ceramics and metal.

In accordance with the present invention, the adhesive material comprises a low melting glass including vanadium pentoxide, zinc fluoride, zinc oxide, boron oxide and aluminum oxide or corundum which is tenacious in adhesion, air and gas tight, has thermal stability and mechanical strength, is resistant to chemicals and is facilely, readily and rapidly utilized with small-sized and irregularly-shaped components.

In accordance with the present invention, the method of adhering ceramics and metal comprises washing the ceramic material and the metal component with hydrochloric acid, providing the adhesive material of the present invention between the ceramic material and the metal, heating in a reduction atmosphere and cooling gradually to room temperature.

In order that the present invention may be readily carried into effect, it will now be described with reference to the accompanying drawing, wherein:

FIG. 1 is an embodiment of a device comprising ceramic material and metal adhered to each other by the adhesive material of the present invention and by the method of the present invention; and FIG. 2 is another embodiment of a device comprising ceramic material and method adhered to each other by the adhesive material of the present invention and by the method of the present invention.

The adhesive material of the present invention comprises vanadium pentoxide ($V_2O_5$), zinc fluoride ($ZnF_2$), zinc oxide (ZnO), boron oxide ($B_2O_3$), aluminium oxide ($Al_2O_3$) and titanium dioxide ($TiO_2$). In a preferred embodiment of the present invention, the adhesive material comprises, in percentage by weight, 15% vanadium pentoxide, 28% zinc fluoride, 27% zinc oxide, 21% boron oxide, 4.5% aluminum oxide and 4.5% titanium dioxide.

The preferred embodiment of adhesive material of the present invention has a specific gravity of 3.34, a linear thermal expansion coefficient of $51.0 \times 10^{-7}$ per degree centigrade from 50 to 350 degrees centigrade, an electrical resistance greater than $10^4$ megohms, a deformation point temperature of 485° C. and an optimum operating temperature of 800° C.

The vanadium pentoxide, the boron oxide and the zinc oxide together form a glass having a low melting point. The addition of zinc fluoride to this material improves the resistance to water, improves the durability, enchances the adhesive properties and prevents devitrification of the material.

When the percentage, by weight, of vanadium pentoxide in the adhesive material, is 10 to 45%, the material or glass becomes liquid between 700 and 900 degrees centigrade. When such liquid contacts ceramic material, the vanadium erodes and diffuses in the ceramic material to form an intermediate layer. If the ceramic material is an alumina ceramic, the aluminum oxide in the glass and the aluminum in the ceramic material interact. If the ceramic material is a beryllia ceramic, the zinc fluoride in the glass and the beryllium in the ceramic material interact. The interaction of the metals creates strong adhesion of the glass with the ceramic material.

When the percentage, by weight, of vanadium pentoxide in the adhesive material, is more than 25%, the resistance of the material to water and to chemicals gradually decreases and the temperature at which the material or glass becomes liquid is lowered. These effects may be alleviated to a great extent by melting the glass in a manner whereby the water in the glass is eliminated and the vanadium valence is controlled.

When the percentage, by weight, of vanadium pentoxide in the adhesive material is more than 60%, the resistance of the material to water and to chemicals is decreased as is the electrical resistance and the material or glass is susceptible to devitrification. These effects make the material unsuitable as an adhesive.

When the percentage, by weight, of vanadium pentoxide in the adhesive material, is less than 10%, mutual interaction of the metals in the glass and in the ceramic material gradually weakens and the temperature at which the material or glass becomes liquid is lowered. These effects considerably weaken the adhesive properties of the material.

The most tenacious and desirable adhesive properties between ceramics, the greatest resistance to water and chemicals and the greatest thermal stability and other properties are attained by the adhesive material of the present invention when the percentage by weight of vanadium pentoxide is 10 to 45%. The tenacity of adhesion between ceramic material and metal is also great when the percentage by weight of vanadium pentoxide is 10 to 45%. This is especially true with "Kovar," to which the adhesive material of the present invention adheres with great tenacity. The coefficient of thermal expansion of "Kovar" and of the adhesive material of the present invention are essentially the same.

In adhering ceramics or in adhering ceramic material and metal, the atomsphere, temperature and time are controlled. In the method of the present invention, a weak reduction atmosphere is preferred. A strong reduction atmosphere and oxidizability weaken the adhesion properties of the adhesive material. The temperature and time are determined by the composition of the adhesive material and by the materials to be adhered.

FIGS. 1 and 2 are embodiments of a device comprising ceramic material and metal adhered to each other by the method of the present invention. Furthermore, FIGS. 1 and 2 are embodiments of a device comprising ceramic material and metal adhered to each other by the adhesive material of the present invention. In each of FIGS. 1 and 2, an alumina type ceramic is adhered to a Kovar wire.

In FIG. 1, which may comprise, for example, a semiconductor device, a ceramic material 1 of, for example, alumina type is adhered to Kovar lead wires 2 by the adhesive material or glass 3 of the present invention comprising, in percentage by weight, 15% vanadium pentoxide, 28% zinc fluoride, 27% zinc oxide, 21% boron oxide, 4.5% aluminum oxide and 4.5% titanium dioxide. A metal layer 4 may be provided on portions of the ceramic surfaces, as shown, and a semiconductor body 5 may be positioned on the ceramic material 1.

In FIG. 2, which may also comprise a semiconductor device, a ceramic material 11 of alumina type is adhered to Kovar lead wires 12 by the adhesive material or glass 13 of the present invention comprising, in percentage by weight, 15% vanadium pentoxide, 28% zinc fluoride, 27% zinc oxide, 21% boron oxide, 4.5% aluminum oxide and 4.5% titanium dioxide. A metal layer 14 may be provided on portions of the ceramic surfaces, as shown, and a semiconductor body 15 may be positioned on the metal layer 14.

In accordance with the method of the present invention of adhering ceramics and metal, the adhesive material 3 or 13 of the present invention is provided in film or fibrous form by any suitable method such as, for example, a sintering method. The surface of the ceramic material 1 or 11 are then washed with hydrochloric acid of approximately 10% in solution. The lead wires 2 or 12 are washed with concentrated hydrochloric acid.

The adhesive material 3 or 13 of the present invention is positioned between the ceramic 1 or 11 and the metal 2 or 12, as shown in FIGS. 1 and 2, and the device is heated rapidly in a weak reduction atmosphere of hydrogen, nitrogen and water. The temperature is held at approximately 800 to 850 degrees centigrade for approximately 15 minutes and is then cooled to approximately 500 degrees centigrade. The device is then gradually cooled to room temperature.

The finished device is a unitary structure with the lead wires 2 and 12 and the ceramics 1 and 11 in tenacious adhesion. The lead wires 2 and 12 may comprise copper, aluminum or stainless steel, rather than Kovar and the ceramic material may be other than alumina type ceramic material and the tenacity of adhesion will be as great as in the illustrated example. Furthermore, the tenacity of adhesion is great regardless of small-size or irregular or complex configurations of the components.

While the invention has been described by means of specific examples and in specific embodiments, we do not wish to be limited thereto, for obvious modifications will occur to those skilled in the art without departing from the spirit and scope of the invention.

We claim:

1. An adhesive material, comprising vanadium pentoxide in an amount of approximately 15% by weight, zinc fluoride, zinc oxide in an amount of approximately 27% by weight, boron oxide in an amount of approximately 21% by weight, aluminum oxide and titanium dioxide.

2. An adhesive material, comprising vanadium pentoxide in an amount of approximately 15% by weight, zinc fluoride in an amount of approximately 28% by weight, zinc oxide in an amount of approximately 27% by weight, boron oxide in an amount of approximately 21% by weight, aluminum oxide and titanium dioxide.

3. An adhesive material, comprising vanadium pentoxide in an amount of approximately 15% by weight, zinc fluoride in an amount of approximately 28% by weight, zinc oxide in an amount of approximately 27% by weight, boron oxide in an amount of approximately 21% by weight, aluminum oxide in an amount of approximately 4.5% by weight and titanium dioxide.

4. An adhesive material, comprising vanadium pentoxide in an amount of approximately 15% by weight, zinc fluoride in an amount of approximately 28% by weight, zinc oxide in an amount of approximately 27% by weight, boron oxide in an amount of approximately 21% by weight, aluminum oxide in an amount of approximately 4.5% by weight and titanium dioxide in an amount of approximately 4.5% by weight.

5. A method of adhering ceramic material and metal, comprising the steps of
   washing the ceramic material with a substantially weak solution of hydrochloric acid;
   washing the metal with a concentrated solution of hydrochloric acid;
   providing adhesive material comprising vanadium pentoxide in an amount of 10% to 45% by weight, zinc fluoride in an amount of approximately 28% by weight, zinc oxide in an amount of approximately 27% by weight, boron oxide in an amount of approximately 21% by weight and aluminum oxide between said ceramic material and said metal;
   heating said ceramic material, metal and adhesive material in a weak reduction atmosphere rapidly to a temperature in the range of 800 to 850° C.; and
   cooling said ceramic material, metal and adhesive material to room temperature.

6. A method of adhering ceramic material and metal, comprising the steps of
   washing the ceramic material with a substantially weak solution of hydrochloric acid;
   washing the metal with a concentrated solution of hydrochloric acid;
   providing adhesive material comprising vanadium pentoxide in an amount of 10% to 45% by weight, zinc fluoride in an amount of approximately 28% by weight, zinc oxide in an amount of approximately 27% by weight, boron oxide in an amount of approximately 21% by weight and aluminum oxide between said ceramic material and said metal;
   heating said ceramic material, metal and adhesive material in a weak reduction atmosphere rapidly to a temperature in the range of 800 to 850° C.; and
   cooling said ceramic material, metal and adhesive material to approximately 500° C. and gradually cooling to room temperature.

7. A method of adhering ceramic material and metal, comprising the steps of
   washing the ceramic material with a substantially weak solution of hydrochloric acid;
   washing the metal with a concentrated solution of hydrochloric acid;
   providing adhesive material comprising vanadium pentoxide in an amount of 10% to 45% by weight, zinc fluoride in an amount of approximately 28% by weight, zinc oxide in an amount of approximately 27% by weight, boron oxide in an amount of approximately 21% by weight and aluminum in the amount of approximately 4.5% by weight between said ceramic material and said metal;

heating said ceramic material, metal and adhesive material in a weak reduction atmosphere rapidly to a temperature in the range of 800° to 850° C.;

maintaining said temperature for approximately 15 minutes;

cooling said ceramic material, metal and adhesive material to approximately 500° C.; and cooling gradually from 500° C. to room temperature.

References Cited

UNITED STATES PATENTS

| 2,063,252 | 12/1936 | Kinzie | 106—48 |
| 2,988,853 | 6/1961 | Certa | 65—43 |
| 3,114,646 | 12/1963 | Currie | 106—48 |
| 3,117,881 | 1/1964 | Henry et al. | 65—33 X |
| 3,171,750 | 3/1965 | Bennett et al. | 156—89 X |
| 3,189,512 | 6/1965 | Strong | 106—48 X |
| 3,175,937 | 3/1965 | Bayer et al. | 156—89 |
| 3,220,815 | 11/1965 | McMillan et al. | 65—59 X |
| 3,254,403 | 6/1966 | Buyers et al. | 29—472.9 |
| 3,365,779 | 1/1968 | Buyers et al. | 29—473.1 |

HAROLD ANSHER, *Primary Examiner.*

U.S. Cl. X.R.

65—59; 106—48; 156—89, 325; 161—193, 225